US 012084298B2

(12) United States Patent
Chlebovec

(10) Patent No.: US 12,084,298 B2
(45) Date of Patent: Sep. 10, 2024

(54) BLOW-THROUGH ROTARY VALVE

(71) Applicant: Schenck Process Europe GmbH, Darmstadt (DE)

(72) Inventor: Michal Chlebovec, Poprad-Velka (SK)

(73) Assignee: Schenck Process Europe GmbH, Darmstadt (DE)

( * ) Notice: Subject to any disclaimer, the term of this patent is extended or adjusted under 35 U.S.C. 154(b) by 99 days.

(21) Appl. No.: 17/886,241

(22) Filed: Aug. 11, 2022

(65) Prior Publication Data

US 2022/0380147 A1  Dec. 1, 2022

Related U.S. Application Data

(63) Continuation of application No. PCT/EP2021/052473, filed on Feb. 3, 2021.

(30) Foreign Application Priority Data

Feb. 11, 2020 (GB) .................................. 2001849

(51) Int. Cl.
*B65G 53/16* (2006.01)
*B65G 53/46* (2006.01)
*B65G 65/48* (2006.01)

(52) U.S. Cl.
CPC ......... *B65G 53/4641* (2013.01); *B65G 65/48* (2013.01)

(58) Field of Classification Search
None
See application file for complete search history.

(56) References Cited

U.S. PATENT DOCUMENTS

| | | | |
|---|---|---|---|
| 2,757,049 A * | 7/1956 | Temple | B65G 53/4633 406/67 |
| 2,852,315 A | 9/1958 | Lenhart | |
| 2,960,245 A | 11/1960 | Knapp | |
| 2,984,872 A * | 5/1961 | France | D01B 1/04 19/48 R |
| 3,085,834 A * | 4/1963 | Woten | E04F 21/12 406/53 |
| 3,223,288 A * | 12/1965 | Stern | B65G 53/4633 406/67 |
| 4,009,912 A * | 3/1977 | Mraz | B65G 53/14 406/120 |
| 4,015,754 A * | 4/1977 | Leurs | B65G 53/4633 406/67 |

(Continued)

FOREIGN PATENT DOCUMENTS

| | | | |
|---|---|---|---|
| DE | 7146496 U | 3/1972 | |
| DE | 202009017709 U1 * | 10/2011 | ......... B65G 53/4641 |

(Continued)

OTHER PUBLICATIONS

International Search Report dated May 11, 2021 in corresponding application PCT/EP2021/052473.

(Continued)

*Primary Examiner* — Joseph A Dillon, Jr.
(74) *Attorney, Agent, or Firm* — Muncy, Geissler, Olds & Lowe, P.C.

(57) ABSTRACT

A self-cleaning rotary assembly for use with a blow-through rotary valve, an improved blow-through rotary valve and a method of conveying material in a pneumatic pipeline employing an improved blow-through rotary valve.

23 Claims, 9 Drawing Sheets

(56) References Cited

U.S. PATENT DOCUMENTS

| | | | | |
|---|---|---|---|---|
| 5,933,920 | A * | 8/1999 | Winn | D01B 1/04 |
| | | | | 19/40 |
| 6,666,627 | B1 * | 12/2003 | Wysong | B65G 53/4641 |
| | | | | 406/102 |
| 6,669,411 | B2 * | 12/2003 | Salley, Jr. | B65G 53/4691 |
| | | | | 406/64 |
| 6,966,466 | B2 * | 11/2005 | Jensen | B65G 53/4633 |
| | | | | 222/368 |
| 11,541,489 | B2 * | 1/2023 | Chlebovec | B65G 53/4633 |
| 2020/0406210 | A1 * | 12/2020 | Hoener | B01J 19/1818 |
| 2022/0380146 | A1 * | 12/2022 | Chlebovec | B65G 53/4633 |

FOREIGN PATENT DOCUMENTS

| | | | | |
|---|---|---|---|---|
| DE | 102011084787 A1 * | 4/2013 | | B65G 65/4881 |
| DK | 1704369 T3 * | 10/2018 | | |
| FR | 2404075 A1 | 4/1979 | | |
| GB | 1572755 A * | 8/1980 | | B65G 53/46 |
| JP | 2004315135 A | 11/2004 | | |

OTHER PUBLICATIONS

Written Opinion of the International Searching Authority dated May 11, 2021 in corresponding application PCT/EO2021/052473.
Indian Office Action dated Jan. 31, 2023 in corresponding application 202237035607.
United Kingdom Office Action dated Jan. 23, 2023 with search report dated Mar. 24, 2020 in corresponding application GB2001849. 5.

* cited by examiner

BLOW-THROUGH ROTARY VALVE

This nonprovisional application is a continuation of International Application No. PCT/EP2021/052473, which was filed on Feb. 3, 2021, and which claims priority to Great Britain Patent Application No. 2001849.5, which was filed in Great Britain on Feb. 11, 2020, and which are both herein incorporated by reference.

BACKGROUND OF THE INVENTION

Field of the Invention

The present invention relates to an improved rotor assembly for use with a blow-through rotary valve, a blow-through rotary valve for use in pneumatic conveying of particulate material and to a method of conveying material in a pneumatic pipeline.

Description of the Background Art

Pneumatic conveying by pressure or vacuum are techniques employed to transport particulate materials along a pipeline. These techniques are typically employed to transport materials over distances typically in the range from about 10 m to 500 m, and in some cases even further. Pneumatic conveying avoids the need for the use of conveyor belts or the like, which can be bulky and costly to maintain and/or difficult to adapt to feed the burning process.

Pneumatic conveying techniques are particularly useful where material must be transported along a complex path, or to multiple delivery points. These techniques also ensure that the particulate material can be entirely contained within a pipeline, which may avoid the need to deal with dust from and/or contamination of the material along the path of the conveying pipeline.

Rotary valves are usually placed under silos, hoppers, other container or mechanical conveying systems and are used, among other purposes, to feed pneumatic conveying lines from hopper, silo, cyclone, and big bag or conveyor discharge stations. This aids in preventing air leakage from the conveying line while maintaining constant feeding of bulk materials.

The prime function of a rotary valve is to regulate the flow from one chamber to another while maintaining a good airlock condition, in order to minimize air leakage and to introduce the material to the pneumatic system.

Airlock rotary valves separate the pressure differentials on the inlet and outlet side of the valve while allowing product to flow between the two. This type of rotary valves comprises a cellular rotor formed from a shaft with a plurality of vanes or blades. The space between two consecutive vanes or blades defines cells or chambers which are configured to each receive a predetermined volume of bulk solids (e.g. particulate materials such as coal, wood, dust, waste material and the like). The bulk solids are loaded by gravity into the rotary valve (e.g. from conveyor discharge, a hopper or silo) through an inlet. As the shaft rotates, any material that has been loaded in the chambers exits the rotary valve via an outlet.

Blow-through rotary valves are coupled to an area in which pressure differential is applied (e.g. an air stream can be applied in a pneumatic conveying pipeline). The outlet of blow-through rotary valves is coupled to a pneumatic conveying line. In use, material loaded into the rotary valve may exit the rotary valve via the outlet and is forced to travel through the conveying pipeline by means of a pressure differential, for example created by a stream of air.

In order to keep the leakage of air within acceptable limits, the gap between the cellular 15 rotor of the rotary valve and the housing is generally reduced to a minimum and maintained as far a possible during the operation.

Some materials, particularly lightweight, sticky, bulky or moist materials, can stick to the walls of rotary valve chambers/cells, which can cause the rotary valve to jam or block and cause intermittent output into pneumatic conveying lines coupled to the rotary valves.

Blow-through rotary valves have been used for feeding high-wear, high-viscosity materials to pneumatic lines for many years. Example materials which may be transported are 'alternative fuels' or 'refuse derived fuels' (RDF). These materials may comprise wood chips, production waste, shredder fraction, shredded tires, recycled waste, and/or waste dust.

If, due to extremely disruptive materials (e.g. abrasive materials) and the resulting damage of the sealing gap, there is a dramatic increase in the leakage of air and this is not immediately offset by adjusting the amount of conveying air, then the lack of conveying air can cause failure of the pneumatic conveying system and blockage of the conveying line. In case of failure, the production must be stopped to clean/repair the rotary valve, thus resulting in expensive downtime.

Furthermore, when material residue remains in the chambers of the rotor assembly (e.g. if it sticks to the walls of the chamber), the effective volume of the chamber is reduced and therefore the efficiency in the transport of material through the blow-through rotary valve is decreased.

Cleaning of the chambers of the rotary valve or cells during operation is therefore key, particularly in pneumatic conveying systems for disruptive materials.

Prior art systems employ soft or hard blades or scrapers to scrape the material stuck to the walls of the rotary valve chambers or cells as it rotates. Some prior art systems also use particles of the conveyed bulk material itself as abrasive particles to "sand blast" any material which has adhered to the walls of the rotor chambers.

Thus, improved cleaning solutions for blow-through rotary valves are required.

SUMMARY OF THE INVENTION

It is therefore an object of the present invention to obviate or mitigate at least one or more of the aforementioned problems.

It is a further object of at least one aspect of the present invention to provide an improved rotor assembly for use with a blow-through rotary valve.

It is a yet further object is one aspect of the present invention to provide an improved blow-through rotary valve.

According to a first aspect of the present invention there is provided a rotor assembly for a blow-through rotary valve, the rotor assembly comprising: a drive shaft, defining a drive axis along its length; and at least one chamber operatively connected to the drive shaft, the at least one chamber comprising a first end wall and second end wall, the first and second end walls axially spaced along the drive axis; and a first side wall and second side wall, the first and second side walls extending substantially laterally from the drive axis, each side wall extending substantially parallel to the drive axis, the at least one chamber defining an opening at or towards a radial outer portion of the chamber; and wherein the at least one chamber is asymmetric along a plane containing the drive axis so that, in use, the at least one chamber stimulates a vortex flow when the opening of the chamber is in contact with a gas flow. In other words, a portion of the at least one chamber may be operatively connected with or be integral with or extend from the drive axis. The first end wall and the second end wall of the at least one chamber may be disposed at an angle from the drive axis and disposed along the direction of the drive axis.

The first end wall may be disposed from about 130° to about 170° to the second end wall. The first end wall and the second end wall may be offset by about 130°, or by about 135°, or by about 140°, or by about 145°, or by about 150°, or by about 155°, or by about 160°, or by about 165°, or by about 170°. The second end wall may extend from the drive axis.

The at least one chamber may define a concave surface along the general direction of the drive axis. The at least one chamber may define a concave surface from the first end wall to the second end wall. The concave surface, in use, may be configured to receive material. The concave surface may be an asymmetric concave surface. The at least one chamber may define a concave surface along a plane containing the drive axis, the concave surface being configured to receive material in use. The concave surface may be an asymmetric concave surface. In use, the concave surface of the chamber may stimulate vortex flow when the opening of the chamber is in contact with a gas flow. In other words, the inner surface of the at least one chamber or cavity may be a concave surface along the drive axis.

The side of the at least one chamber which is not configured to be in contact with material (i.e. the side of the chamber opposite the concave surface) may define a convex surface. At least part of the convex surface of the chamber may be integral with or operatively coupled to the drive shaft along the drive axis. The second end wall may extend from the drive axis. In other words, an outer surface of the chamber may be convex and this convex surface may be operatively attached to or integral with the drive shaft.

The rotor assembly may comprise a plurality of chambers. The chambers may be arranged in a circular or a substantially circular pattern around the drive shaft. The chambers may be in any form of elliptical pattern around the drive shaft.

The first end wall and the second end wall may be directly connected. There may be an intermediate portion between the first and second end walls. There may be multiple intermediate portions. At least one of the intermediate portion or portions may be parallel or substantially parallel to the drive axis.

The first end wall, the second end wall, and any intermediate portion or portions if present may be a continuous surface. For example, the first end wall, the second end wall and the intermediate portion may form a continuous surface which may be a continuous curved surface. For example, the first end wall, the second end wall and the intermediate portion may be a continuous parabolic surface. The first end wall, the second end wall, and any intermediate portion or portions if present may be independent surfaces connected between each other.

For example, in embodiments in which there is a first end wall, an intermediate portion (if present) and a second end wall, the first end wall may be connected (e.g. welded or otherwise coupled) to or integral with the second end wall. The first end wall may be connected (e.g. welded or otherwise coupled) to or integral with the intermediate portion at one side of the intermediate portion and the second end wall may be connected (e.g. welded or otherwise coupled) to or integral with the opposite side of the intermediate portion.

The first side wall may be connected to (e.g. welded or otherwise coupled) or integral with the first end wall, the intermediate portion (if present) and the second end wall along the longitudinal axes of the first end wall, intermediate portion (if present) and second end wall.

The second side wall may be connected to (e.g. welded or otherwise coupled) or integral with the first end wall, the intermediate portion (if present) and the second end wall along the longitudinal axes of the first end wall, intermediate portion (if present) and second end wall. The first and second side walls may be connected to (e.g. welded or otherwise coupled) or integral with the first end wall, the intermediate portion (if present) and the second end wall at either and/or opposite sides of the drive axis.

The first end wall may extend at a first angle relative to the drive axis. The second end wall may extend at a second angle relative to the drive axis. The first angle and the second angle may be different. The first angle and the second may be the same. The first angle may be an obtuse angle. The second angle may be an obtuse angle. The first angle may be greater than the second angle.

The first end wall may extend at a first angle relative to the intermediate portion. The second end wall may extend at a second angle relative to the intermediate portion. The intermediate portion may be aligned with or parallel to the drive axis and therefore the angle between the first/second end wall and the intermediate portion may be the same as the angle between the first/second wall and the drive axis.

The first angle and the second angle may be different. The first angle and the second may be the same. The first angle may be an obtuse angle. The second angle may be an obtuse angle. The first angle may be greater than the second angle.

The first angle may range from about any of the following: from about 130° to about 170°; from about 130° to about 160°, from about 130° to about 150°; from about 130° to about 140°; from about 130° to about 135°; from about 145° to about 150°; from about 140° to about 170°; from about 150° to about 160°; from about 155° to about 160°; from about 140° to about 150°; from about 145° to about 150°; or from about 150° to about 155°, from about 160° to about 170°, from about 165° to about 170°, from about 160° to about 165°. The first angle may be selected from any of the following: about 125°; about 130°; about 135°; about 140°; about 145°; about 150°; about 155°; about 160°; or about 165°, about 160°, about 175°.

The second angle may range from about any of the following: about 130° to about 180°; from about 130° to about 170°; from about 130° to about 160°; from about 130° to about 150°; from about 130° to about 140°; from about 130° to about 135°; from about 145° to about 150°; from about 140° to about 160°; from about 150° to about 170°; from about 150° to about 160°; from about 155° to about 160°; from about 170° to about 180°; from about 160° to about 170°; from about 160° to about 180°; from about 140° to about 150°; from about 145° to about 150°; from about 150° to about 155°. The first angle may be selected from any of the following: about 125°; about 130°; about 135°; about 140°; about 145°; about 150°; about 155°; about 160°; about 165°; about 170°; about 175°; about 180° or about 185°.

An edge (e.g. an outer edge or outermost portion) of the first end wall may be disposed at a first distance (aa) from the drive axis. An edge (e.g. an outer edge or outermost portion) of the second end wall may be disposed at a second distance (bb) from the drive axis. The first distance (aa) may be greater than the second distance (bb).[A1]

The first end wall may be longer than it is wide. The second end wall may be longer than it is wide. The intermediate portion may be a longer than it is wide. The intermediate portion may be longer than it is wide.

The first end wall may longer than the second end wall. The first end wall and/or the second end wall may be longer than the intermediate portion. The first end wall may be about 10% longer than the second end wall, or about 15% longer than the second wall, or about 20% longer than the second end wall, or about 25% longer than the second wall, or about 30% longer than the second wall, or about 35% longer than the second wall, or about 40% longer than the second wall, or about 45% longer than the second wall, or about 50% longer than the second wall.

The first end wall may be at least 25% of the length of the chamber along the drive axis. The first end wall may be at least 30%, or at least 35%, or at least 40% or at least 45%, or at least 55% of the length of the chamber along the drive axis.

Within the context of this application, the length of the chamber along the drive axis may be defined as the length of the surface disposed along the drive axis. In other words, the length of the chamber along the drive axis may comprise the distance from an edge of the first end wall to an edge of the second end wall, measured along the direction of the drive axis.

The chamber may define a basket or bucket. The chamber may define an asymmetric basket or bucket. The chamber may define a triangular basket or bucket. The chamber may define a scalene triangular basket or bucket. The chamber may define a trapezoidal basket or bucket. The chamber may define an isosceles trapezoidal basked or bucket. The chamber may define a scalene trapezoidal basket or bucket. The chamber may define an acute trapezoidal basket or bucket.

The rotor assembly may be self-cleaning. The rotor assembly may employ the Coanda effect for cleaning the chamber or chambers of the rotor assembly. The geometry of the chamber or chambers of the rotor assembly may generate a vortex flow inside the said chamber of chambers when the chamber is in contact with a gas flow (e.g. from a pneumatic pipeline).

In use, the rotor assembly may be configured to be disposed inside a housing of a blow-through rotary valve and the rotor assembly may be configured to rotate about the drive axis so that the chamber defines a loading configuration in which the chamber opening is operatively connected to a housing inlet and an unloading configuration in which the chamber opening is operatively connected to a housing outlet. The rotary chamber may be configured to receive material via the housing inlet when the rotor assembly is in the loading configuration.

In use, the chamber may be configured to receive a gas flow in the unloading configuration so that the gas flow assists in removing the material from the chamber.

The chamber may define an asymmetrical flow-path of gas inside the chamber in the unloading configuration, so that the asymmetrical flow-path scrapes the material from the walls of the chamber.

In embodiments in which the first end wall is longer than the second end wall, when the rotor assembly is in the unloading configuration, the first end wall may be configured to be located adjacent a pressurized gas inlet of a blow-through rotary valve. The pressurized gas inlet may be configured to deliver pressurized gas flow along a gas axis. The gas axis may be substantially parallel to the drive axis. In use, pressurized gas flow may contact the first end wall, enter the chamber and follow the surface of the chamber from the first end wall to the second end wall, deviating from the gas axis and creating a vortex flow inside the chamber so that material is substantially removed from the walls of the chamber.

When the chamber is in the unloading configuration, at least a portion of the first end wall may intersect the pressurized gas flow. When the chamber is in the unloading configuration, an outermost edge of the first end wall may intersect the pressurized gas flow.

When the chamber is in the unloading configuration, the pressurized gas inlet may be disposed at or towards an outermost portion of the first end wall such that pressurized gas flow from the pressurized gas inlet follows the surface of the chamber from the first end wall to the second end wall.

The pressurized gas inlet may be a primary pressurized gas inlet. The primary pressurized gas inlet may be configured to deliver pressurized gas for substantially removing material from the walls of the chamber and for conveying the material in, for example, a pneumatic pipeline.

The pressurized gas inlet may be a secondary pressurized gas inlet. The secondary pressurized gas inlet may be configured to deliver pressurized gas for substantially removing material from the walls of the chamber.

In the examples in which there is a secondary pressurized gas inlet, there may be in addition a primary pressurized gas inlet for conveying the material in, for example, a pneumatic pipeline. The primary pressurized gas inlet may be configured to deliver pressurized gas along a primary gas axis and the secondary pressurized gas inlet may be configured to deliver pressurized gas along a secondary gas axis. The primary and the secondary gas axes may be substantially parallel to the drive axis. The primary pressurized gas axis, the secondary pressurized gas axis and the drive axis may all be disposed in the same x-y plane (or substantially in the same x-y plane). The primary pressurized gas axis, and the drive axis may be disposed in the same x-y plane (or in substantially the same x-y plane) and the secondary pressurized gas axis may be offset from the x-y plane which contains the primary pressurized gas axis and the drive axis.

The secondary pressurized gas inlet may be located above the primary gas inlet, in the same plane as the primary pressurized gas inlet. The secondary pressurized gas inlet may be located above and to a side of the primary pressurized gas inlet. The secondary pressurized gas inlet may be located above the primary gas inlet, in a different plane as the primary pressurized gas inlet.

The secondary pressurized gas inlet may be disposed adjacent the first end wall. In other words, the secondary pressurized gas inlet may be disposed in close proximity to the first end wall. In use, the pressurized gas exiting the secondary pressurized gas inlet and it may be displaced such that the pressurized gas follows the shape of the chamber from the first end wall to the second end wall. Disposing the secondary pressurized gas inlet adjacent the first end wall may allow the Coanda effect to take place.

The gas flow velocities from the primary and secondary pressurized gas inlets may be substantially equal or similar. The gas flow velocities from the primary and secondary pressurized gas inlets may be different. The gas flow velocities from the primary and the secondary pressurized gas inlets may be subsonic. The gas flow velocities from the primary and secondary gas inlets may be greater than the gas flow velocities from the conveying pipe. The gas flow velocity from the primary and secondary gas inlets may be greater than about 15 m/s. The gas flow velocities from the primary and secondary pressurized gas inlets may be selected from any of the following: from about 100 m/s to about 200 m/s; from about 120 m/s to about 200 m/s; from about 140 m/s to about 200 m/s; from about 160 m/s to about 200 m/s; from about 180 m/s to about 200 m/s; from about 180 m/s to about 200 m/s; from about 100 m/s to about 120 m/s; from about 100 m/s to about 140 m/s; from about 100 m/s to about 150 m/s; or from about 100 m/s to about 160 m/s. Without wishing to be bound by theory, subsonic gas flow velocities from the primary and secondary pressurized gas inlets greater than the gas flow velocity of the conveying pipe may enable a cleaning effect in the chamber without disturbing the conveying flow in the conveying line.

In a second aspect of the invention there is provided a blow-through rotary valve comprising: a housing having an inlet for receiving material and an outlet for releasing the material; a rotor assembly comprising: a drive shaft, defining a drive axis along its length; and at least one chamber operatively connected to the drive shaft, the at least one chamber comprising: a first end wall and second end wall, the first and second end walls axially spaced along the drive axis; and a first side wall and second side wall, the first and second side walls extending substantially laterally from the drive axis, each side wall extending substantially parallel to the drive axis; and the at least one chamber being asymmetric along a plane containing the drive axis and defining an opening at or towards a radial outer portion of the at least one chamber; wherein the rotor assembly is configured to rotate about the drive axis so that the at least one chamber defines: a loading configuration in which the opening of the at least one chamber is operatively connected to the housing inlet; and an unloading configuration in which the opening of the at least one chamber is operatively connected to the housing outlet; a pressurized gas inlet configured to deliver a pressurized gas flow; and a trough for conveying material released from the rotor assembly; wherein the rotor assembly is disposed inside the housing such that the first end wall of the at least one chamber is disposed adjacent to the pressurized gas inlet when the at least one chamber is in the unloading configuration such that; wherein at least a portion of the pressurized gas flow is configured to contact the first end wall of the at least one chamber, enter the chamber and follow the surface of the chamber from the first end wall to the second end wall, deviating from the gas axis and creating a vortex flow inside the at least one chamber.

In the unloading configuration of the at least one chamber, material held in the at least one chamber is configured to be delivered to the trough. For example, the material may fall from the at least one chamber to the trough by gravity. Additionally, the vortex flow may be configured to substantially remove material from the walls of the at least one chamber and to deliver the material to the trough.

The rotor assembly may have any of the features described in the first aspect.

That is, in some embodiments, the blow-through rotary valve may comprise a single pressurized gas inlet. The pressurized gas inlet may be configured to convey material that exits the at least one chamber of the rotary valve in the unloading configuration and to remove material from the walls of the at least one chamber by means of a vortex flow. In those embodiments, the pressurized gas inlet may be a primary pressurized gas inlet which is configured to deliver pressurized gas along a primary gas axis for substantially removing material from the walls of the chamber and for conveying the material in, for example, a pneumatic pipeline.

When the chamber is in the unloading configuration, at least a portion of the pressurized gas flow may deviate from the primary gas axis and create an asymmetrical flow-path of gas inside the chamber, so that the asymmetrical flow-path scrapes the material from the walls of the chamber.

In other embodiments, the blow-through rotary valve may comprise two pressurized gas inlets: a primary pressurized gas inlet and a secondary pressurized gas inlet. The secondary pressurized gas inlet may be configured to remove material from the walls of the at least one chamber by means of a vortex flow. The primary pressurized gas inlet may be configured to convey material that exits the at least one chamber of the rotary valve in the unloading configuration.

The pressurized gas inlet may be a secondary gas inlet which delivers pressurized gas for substantially removing material from the walls of the chamber.

The blow-through rotary valve may further comprise a primary pressurized gas inlet configured to convey the material in a pneumatic pipeline, wherein the primary pressurized gas inlet is configured to deliver pressurized gas along a primary gas axis and the secondary pressurized gas inlet is configured to deliver pressurized gas along a secondary gas axis. The primary and the secondary gas axes may be substantially parallel to the drive axis.

The primary pressurized gas axis and the drive axis may be parallel (or substantially parallel) and vertically (or substantially vertically) aligned with the drive axis. The secondary pressurized gas axis may be parallel (or substantially parallel) and vertically offset from the primary pressurized gas axis and the drive axis.

The secondary pressurized gas inlet may be disposed adjacent the first end wall. In other words, the secondary pressurized gas inlet may be disposed in close proximity to the first end wall. In use, pressurized gas is configured to exit the secondary pressurized gas inlet, contact the first end wall of the at least one chamber and be displaced or deviate from the secondary pressurized gas axis such that the pressurized gas follows the shape of the at least one chamber from the first end wall to the second end wall.

The drive shaft may be configured to rotate around the drive axis, moving the rotor chamber from an upright position to an inverted position. The material may then be released into the trough through the housing outlet. The trough may be operatively connected with a pneumatic pipeline. As the material enters the trough, it may be blown out of the gas outlet from the gas coming from the gas inlet. The material then may be conveyed to a pneumatic pipeline, where it may be transported into a furnace and/or another piece of apparatus.

The pressurized gas inlet (e.g. primary pressurized gas inlet, secondary pressurized inlet or both) may be disposed in the trough area.

The pressurized gas flow may be configured to scrape material stuck to the walls of the rotary chamber when the rotary chamber is disposed above the trough. When the apparatus is connected to a pneumatic pipeline, the pressurized gas flow may be configured to convey all the material that exists the rotary chamber along the trough towards a pneumatic pipeline.

In use, blow-through rotary valves according to the invention can be used for feeding any bulk material in pneumatic conveyor systems. Blow-through rotary valves may be used for feeding of bulky, high-wear, high-viscosity materials for many years. Example materials which may be transported are 'alternative fuels' or 'refuse derived fuels' (RDF). These materials may comprise wood chips, production waste, shredder fraction, shredded tires, recycled waste, and waste dust, dry powders (e.g. in the pharmaceutical industry), dusts (e.g. cement), granular products and the like. Any of these materials may be conveyed using the self-cleaning blow-through rotary valves of the invention, while maintaining an airlock condition.

Advantageously, blow-through rotary valves according to the present invention comprise a self-cleaning rotor assembly. The blow-through rotary valves of the present invention therefore require lower maintenance than conventional blow-through rotary valves. This increases productivity of pneumatic pipelines, since it greatly reduces or avoids the need for stopping production at regular intervals to clean the rotor assembly.

Moreover, the blow-through rotary valves according to the invention provide a more efficient cleaning of the chambers of the rotor assembly compared to prior art blow-through rotary valves which use mechanical means in self-cleaning rotary assemblies.

The self-cleaning rotor assembly of blow-through rotary valves according to the invention is also more efficient than prior art blow-through rotary valves, since maintaining the chambers of the rotor assembly free from residues and/or debris allows the or each chamber of the rotary valve to maximize the volume of material which is transferred at each revolution (i.e. the capacity of the chamber or chambers is not reduced over time). In addition, since all the material that is cleaned from the walls of the chamber or chambers is delivered to the trough, the volume of material that is conveyed using this rotary valve is maximize d. This is clearly advantageous, in particular compared to prior art rotary valve systems in which any material that is cleaned-off from the walls of the chambers of the rotary valve is discarded.

The self-cleaning rotor assembly of blow-through rotary valves according to the invention minimizes problems of clogging or blockage of the blow through rotary valves, which also assists in maintaining the airlock inside the rotary valve. This is particularly advantageous in pneumatic conveyor systems which process sticky or moist materials (for example bulk refuse materials), since this type of material is extremely difficult to process and tends to adhere to the chambers of rotary assemblies, thus causing blockages in conventional blow-through rotary valves.

In a third aspect of the invention there is provided a method of conveying material in a pneumatic pipeline, the method comprising: providing a blow-through rotary valve comprising: a housing having an inlet for receiving material and an outlet for releasing the material; a rotor assembly disposed inside the housing, the rotor assembly comprising: a drive shaft, defining a drive axis along its length; and at least one chamber operatively connected to the drive shaft, the at least one chamber comprising a first end wall and second end wall, the first and second end walls axially spaced along the drive axis; and a first side wall and second side wall, the first and second side walls extending substantially laterally from the drive axis, each side wall extending substantially parallel to the drive axis; and the at least one chamber being asymmetric along a plane containing the drive axis and defining an opening at or towards a radial outer portion of the at least one chamber; wherein the rotor assembly is configured to rotate about the drive axis so that the at least one chamber defines a loading configuration in which the opening of the at least one chamber is operatively connected to the housing inlet; and an unloading configuration in which the opening of the at least one chamber is operatively connected to the housing outlet; a pressurized gas inlet; and a trough for conveying material released from the rotor assembly; connecting the trough of the blow-through rotary valve with a pneumatic pipeline; inserting material through the inlet of the blow-through rotary valve such that the material is loaded in the at least one chamber of the rotor assembly when the blow-through rotary valve is in the loading configuration; rotating the rotor assembly so that the at least one chamber is operatively connected to the outlet of the housing in the unloading configuration; and providing pressurized gas flow via the pressurized gas inlet; wherein when the at least one chamber is in the unloading configuration, at least a portion of the pressurized gas flow contacts the first end wall of the at least one chamber, enters the at least one chamber and follows a surface of the at least one chamber from the first end wall to a second end wall so that the at least a portion of gas flow deviates from the gas axis and creates a vortex inside the at least one chamber, the vortex substantially removing material from the walls of the chamber and delivering the material to the trough; and conveying the material in the pneumatic pipeline.

The pressurized gas inlet may be disposed along a gas axis. The gas axis may be substantially parallel to the drive axis of the rotary valve. The gas axis may not be parallel to the drive axis of the rotary valve.

The rotor assembly and/or the blow-through rotary valve may have any features as defined in the first and second aspects.

Further optional features disclosed in relation to each aspect of the invention correspond to further optional features of any other aspect of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
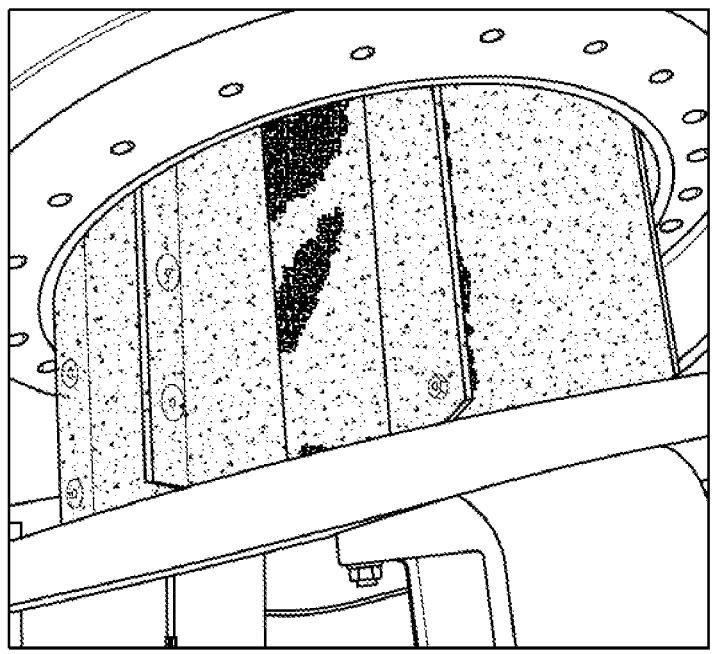
FIG. 1 shows an image of a prior art rotor assembly for a blow-through rotary valve.

FIG. 1 shows an image of a prior art rotor assembly for a blow-through rotary valve. Three of the chambers of rotor assembly can be viewed in the image. Each chamber comprises two side walls extending radially from a drive shaft and extending laterally along the drive shaft and connected by an intermediate portion.

Figure 2:
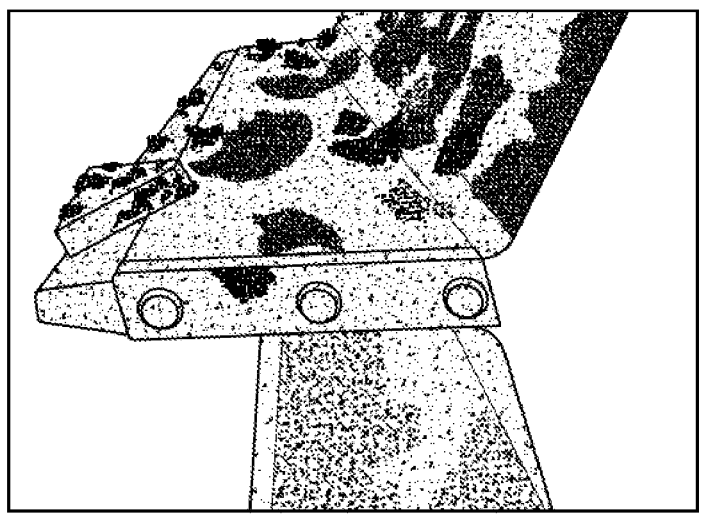
FIG. 2 shows an image of a prior art rotary chamber having material build up.

As represented in FIG. 2, the rotary assemblies of the prior art suffer from material accumulation on the internal walls of the rotor assembly chambers. This is problematic because the capacity volume of the chambers is reduced over time, and it can potentially lead to clogging of the rotor assembly. Therefore, pneumatic conveying lines employing prior art blow-through rotary valves need to be regularly stopped to disassemble the rotary valves in order to access and clean the chambers of the rotary assemblies.

Figure 3:
FIG. 3 shows an image of a chamber of a rotor assembly for a blow-through rotary valve according to an embodiment of the present invention.

FIG. 3 shows an image of a chamber of a rotor assembly for a blow-through rotary valve according to an embodiment of the present invention. After eight months in a confidential plant testing operation which processes waste bulk material, the chamber presents hardly any material build-up on the internal walls of the rotor assembly chamber, despite the processed waste material being sticky. This is because the rotor assembly of the present invention is self-cleaning.

Figure 4A:
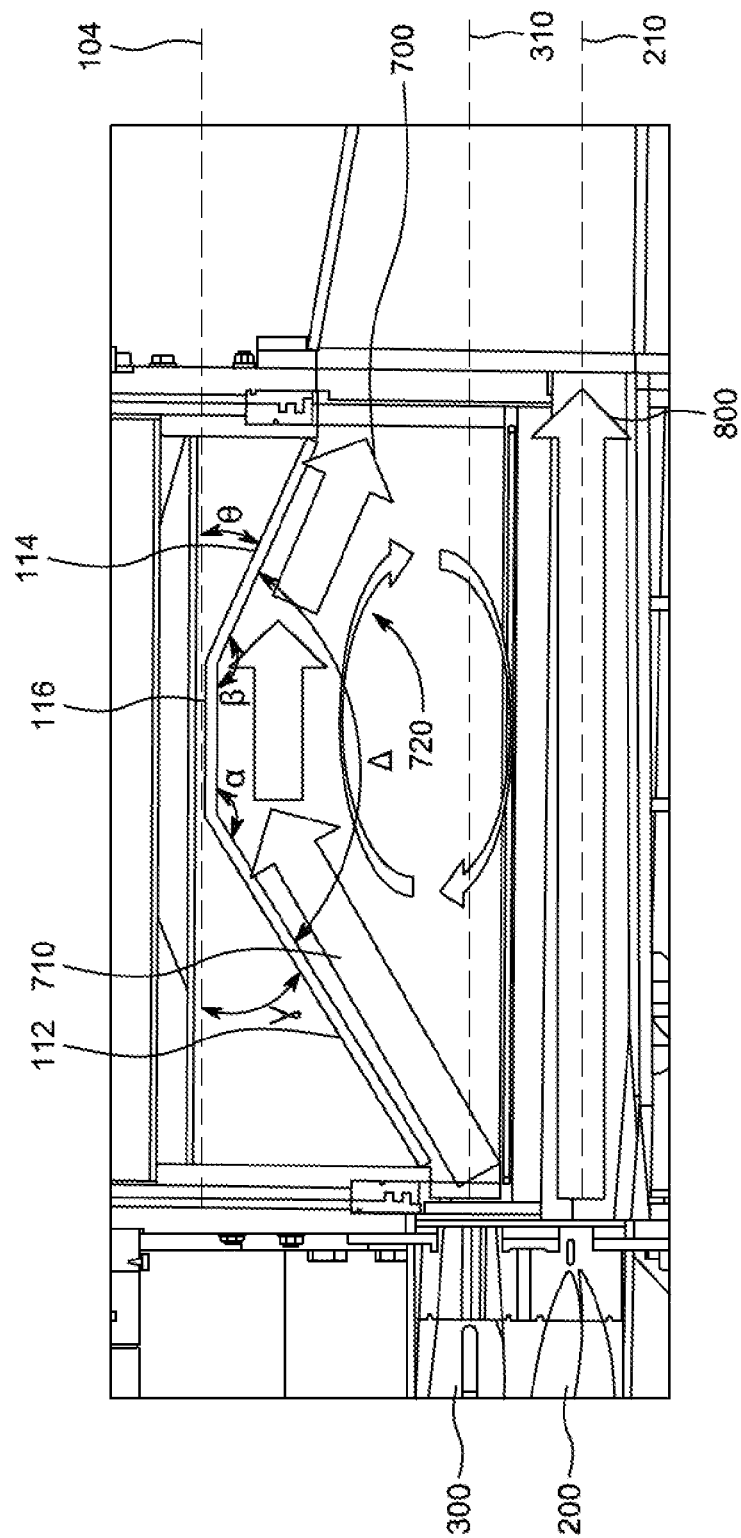
FIG. 4a shows a schematic representation of a vertical cross-section of a chamber of a rotor assembly along a plane x-y according to an embodiment of the present invention.

FIG. 4a is a schematic representation of a vertical cross-section of a chamber of a rotor assembly along a plane x-y according to an embodiment of the present invention. The chamber is shown in an unloading configuration in which the chamber of the rotor assembly is operatively coupled to an outlet in the housing of the rotary valve.

The chamber has a first end wall 112 and a second end wall 114, the first and second end walls 112, 114 being axially spaced along a drive axis 104 which runs along the length of a drive shaft. The first and second end walls 112, 114 are connected by means of an intermediate portion 116. The intermediate portion 116 is substantially parallel to the drive axis 104 of the rotor assembly.

The first end wall 112 extends from the intermediate portion 116 at a first angle α. The first end wall 112 also defines the same first angle with respect to the drive axis 104. The second end wall 114 extends at a second angle β relative to the intermediate portion 116 (and therefore also relative to the drive axis 104). First and second angles α and β are both obtuse and in this particular embodiment first angle α is greater than second angle β. However, first and second angles α and β may be identical or substantially identical. The first angle α may be from about 130° to about 170°. The second angle β may be from about 130° to about 180°.

First end wall 112 is disposed at an angle γ of from about 10° to about 50° with axis 104. Second end wall 114 is disposed at an angle φ of from about 0° to about 50°. First end wall 112 and second end wall 114 are disposed at an angle of from about 80° to about 170° from each other.

The edge (e.g. the outer edge or outermost portion) of the first end wall is disposed at a first distance (aa) from the drive axis. The edge (e.g. an outer edge or outermost portion) of the second end wall is disposed at a second distance (bb) from the drive axis. The first distance (aa) is greater than the second distance (bb).

The first end wall 112 is longer than the second end wall 114. The first end wall 112 is disposed adjacent to a secondary pressurized gas inlet 300. Pressurized gas inlet 300 in this embodiment is a nozzle which delivers pressurized gas (e.g. compressed air) along a secondary gas axis 310. When the pressurized gas encounters the edge of the first end wall, it deviates from the secondary gas axis 310 and follows the surface of the chamber from the first end wall 112 to the second end wall 114, passing by the intermediate portion 116. Therefore, the chamber defines an asymmetrical flow-path of gas 710 inside the chamber in the unloading configuration, so that the asymmetrical flow-path 710 scrapes any material that may be stuck to the walls of the chamber.

Located below and to the left of the secondary pressurized gas inlet 300 there is a primary gas inlet 200, which is also a nozzle which delivers a flow of pressurized gas (e.g. compressed air) 800 along a primary gas axis 210. The secondary pressurized gas inlet 300 is located above the primary gas inlet 200, in a different x-y plane as the primary pressurized gas inlet 200.

The primary pressurized gas inlet 200 supplies a higher volume flow than the secondary pressurized gas inlet 300. The gas flow velocities from the primary and secondary pressurized gas inlets 200, 300 is similar and from about 100 m/s to about 200 m/s. This arrangement generates a pressure differential in the chamber, which leads to the creation of a vortex 720 inside the chamber.

Therefore, the shape of the chamber along the drive axis (i.e. from the first end wall 112, to the intermediate portion 116 and to the second end wall 114) distributes the pressure of the gas flow from the primary 200 and secondary 300 pressurized gas inlets around the internal surface of the chamber and creates an asymmetrical flow-path 710.

Without wishing to be bound by theory, the creation of the asymmetrical flow-path of gas may be based on the Coanda effect.

Figure 4B:
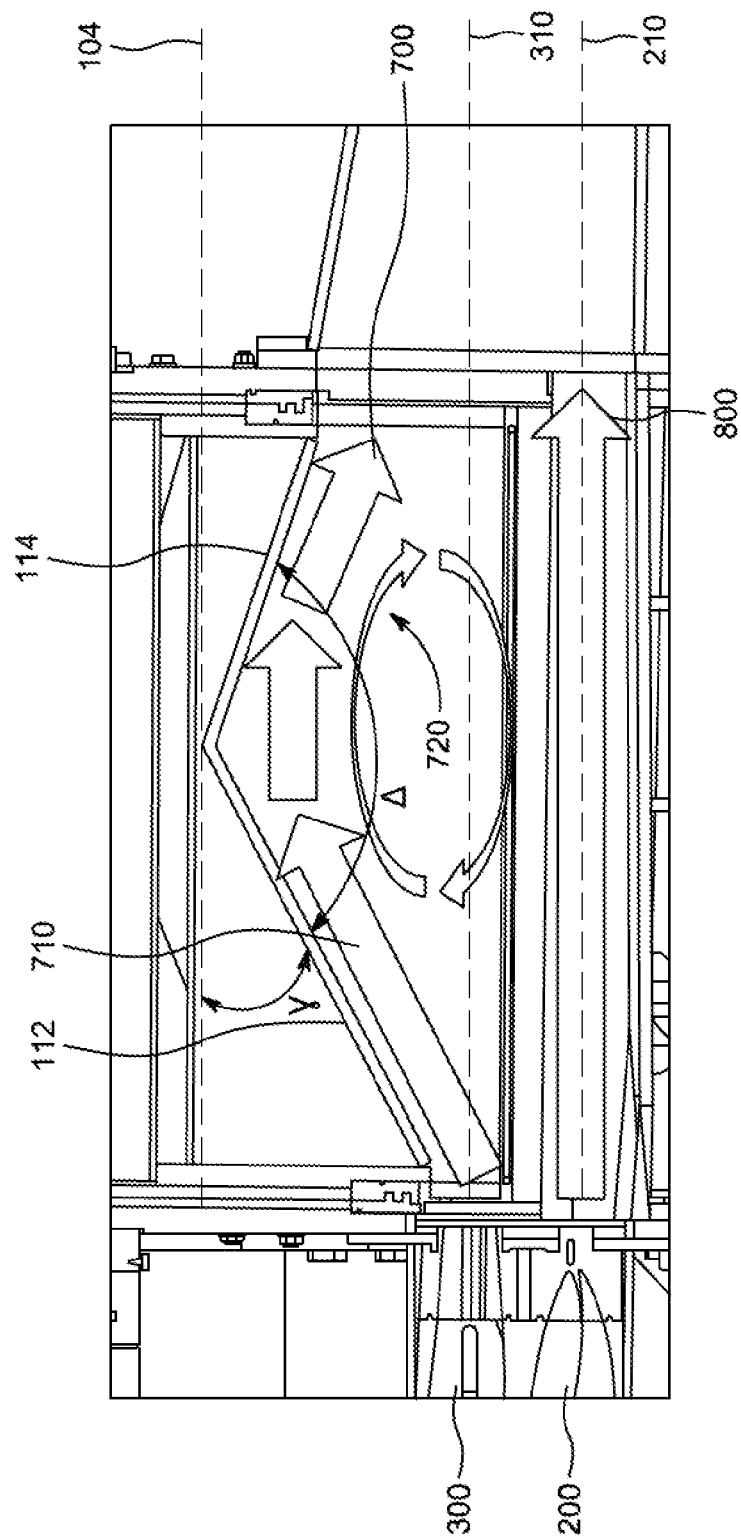
FIG. 4b shows schematic representation of a vertical cross-section of a chamber of a rotor assembly along a plane x-y, similar to that of FIG. 4a, according to another embodiment of the present invention.

FIG. 4b shows a similar schematic representation of a vertical cross-section of a chamber of a rotor assembly according to another embodiment. In this embodiment, the first and second end walls 112, 114 are axially spaced along a drive axis 104 which runs along the length of a drive shaft, but they are directly connected to each other.

First end wall 112 is disposed at an angle γ of from about 10° to about 50° with axis 104. Second end wall 114 is disposed at an angle φ of from about 0° to about 50°. First end wall 112 and second end wall 114 are disposed at an angle of from about 80° to about 170° from each other.

Figure 4C:
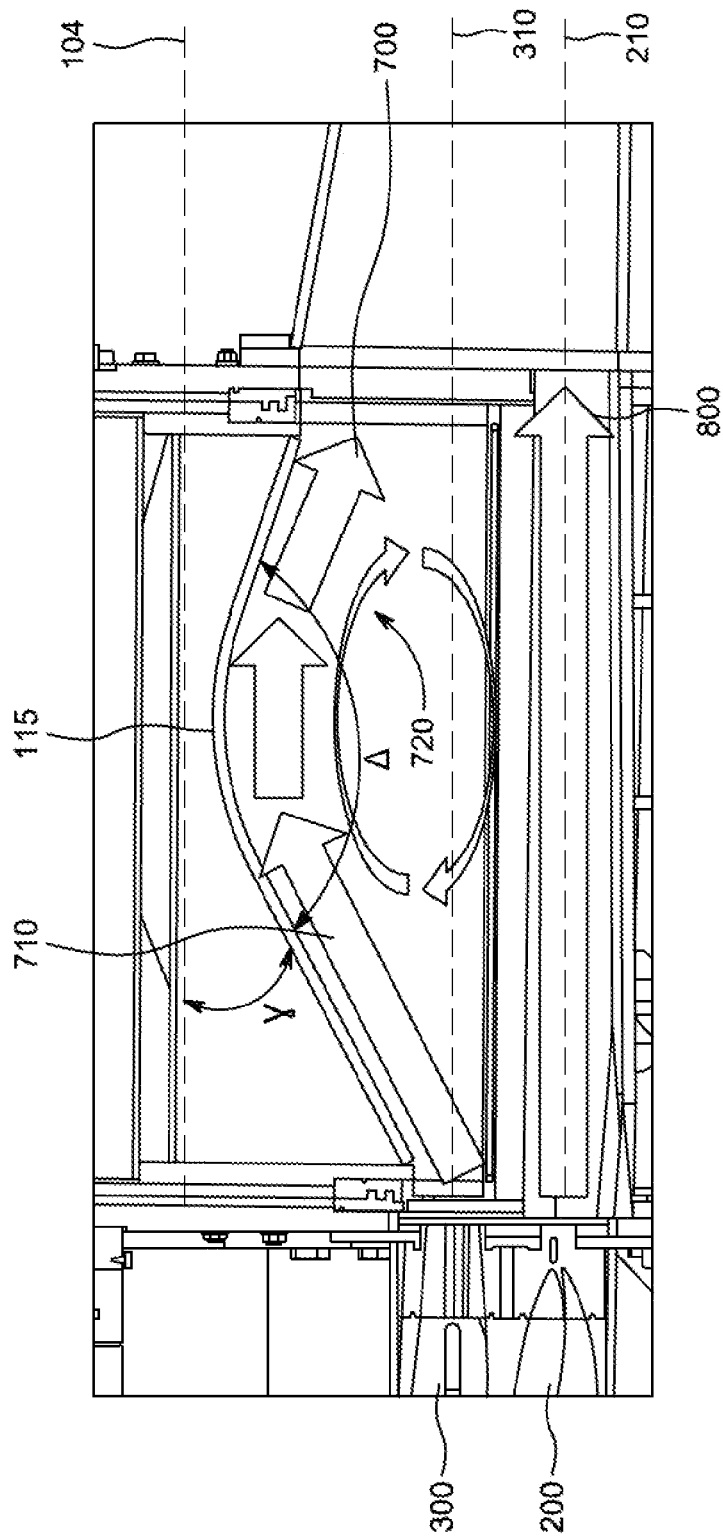
FIG. 4c shows schematic representation of a vertical cross-section of a chamber of a rotor assembly along a plane x-y, similar to that of FIG. 4a, according to another embodiment of the present invention.

FIG. 4c shows a similar schematic representation of a vertical cross-section of a chamber of a rotor assembly according to another embodiment. In this embodiment, the first and second end walls 112, 114 are axially spaced along a drive axis 104 which runs along the length of a drive shaft. First and second end walls are part of a single bent surface, which is operatively connected at a region 116 to a shaft, which runs along an axis 104.

First end wall 112 is disposed at an angle γ of from about 10° to about 50° with axis 104. Second end wall 114 is disposed at an angle δ of from about 0° to about 50°. First end wall 112 and second end wall 114 are disposed at an angle of from about 80° to about 170° from each other.

The chamber may have a curved profile, for example a parabolic shape, in order to enable the Coanda effect to take place.

Figure 5:
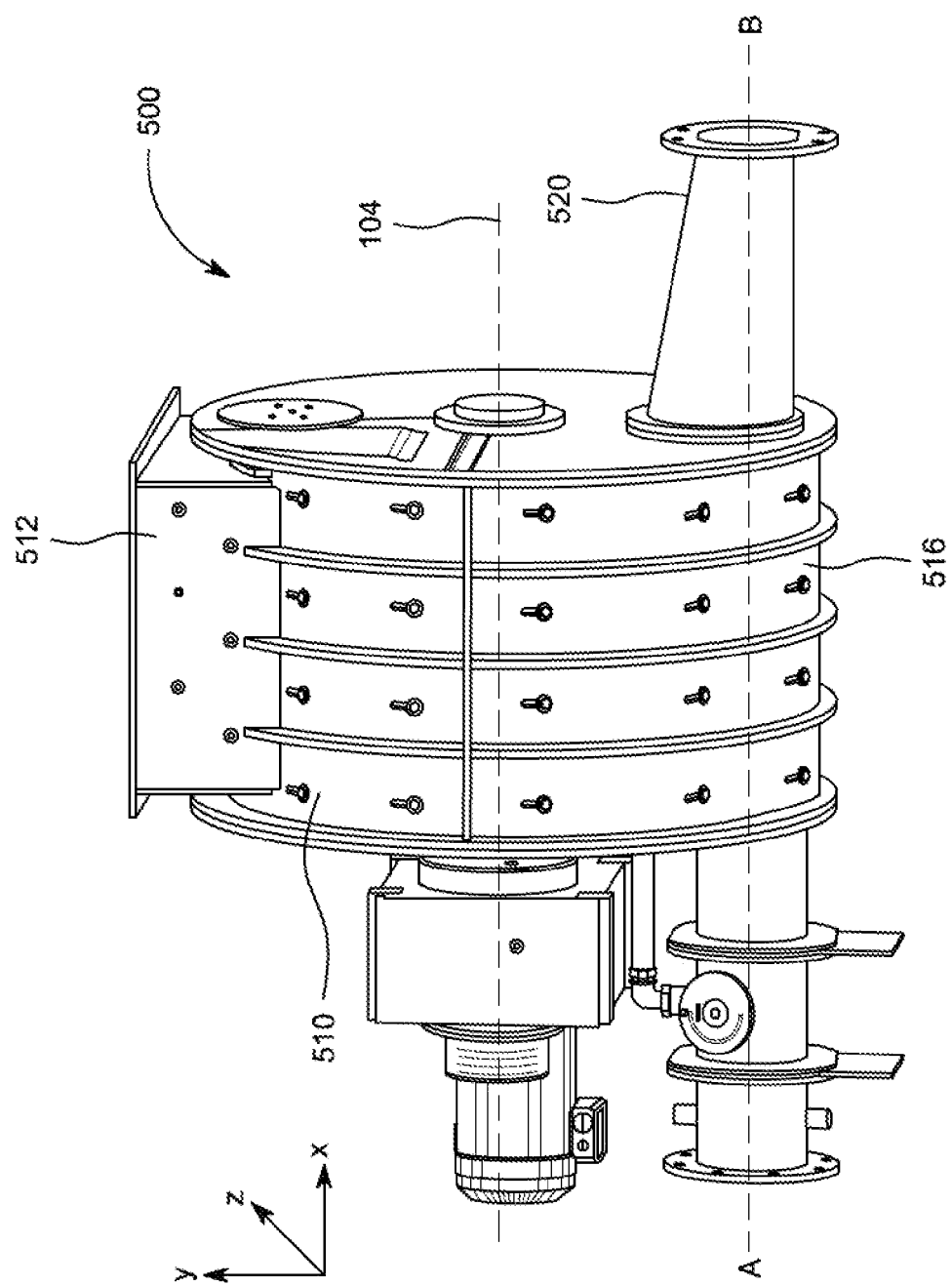
FIG. 5 shows a perspective view of a blow-through rotary valve according to an embodiment of the present invention.

FIG. 5 shows a perspective view of a blow-through rotary valve 500 according to an embodiment of the present invention. In this Figure, the blow-through rotary valve 500 is viewed from the side, along a drive axis 104 of the rotor assembly. The rotor assembly is disposed inside a housing 510 and it is configured to rotate about a shaft which defines the drive axis 104 along its length.

Blow-through rotary valve 500 defines an opening or inlet 512 for receiving material to be conveyed into, for example, a pneumatic pipeline.

Typically, the blow-through rotary valve 500 will be operatively connected to conveying system a hopper, silo or the like container such that bulk material contained therein can enter the blow-through rotary valve 500 via the inlet 512.

Inside housing 510, the rotor assembly 100 rotates about the drive axis 104, thus sequentially exposing the different chambers 106 to the inlet 512 of the housing. As the rotor assembly rotates about the drive axis 104, the chambers of the rotor assembly move from a loading configuration (in this case when an opening of the chamber is accessible via the housing inlet 512) to an unloading configuration (when the opening of the chamber is accessible via an outlet of the housing.

Any material that has been loaded into the chamber in the loading configuration is transported inside the chamber towards the outlet of the housing 510. In the unloading configuration, the material exits the chamber assisted by a pressurized gas flow (e.g. compressed air) which goes in the direction from A to B and it is delivered to a trough 516 of the blow-through rotary valve 500. The trough 516 is connected to an outlet cone 520 and pressurized gas flow conveys the material released from the rotor assembly via the outlet cone 520 to a pneumatic pipeline. By operating this way, the blow-through rotary valve 500 feeds the material into a pneumatic pipeline.

Blow-through rotary valve 500 can be used feeding any bulk material in pneumatic conveyor systems. For example, blow-through rotary valve 500 can be used to feed the waste material (such as household and/or industrial waste material), granular products and the like, while maintaining an airlock condition.

Figure 6:
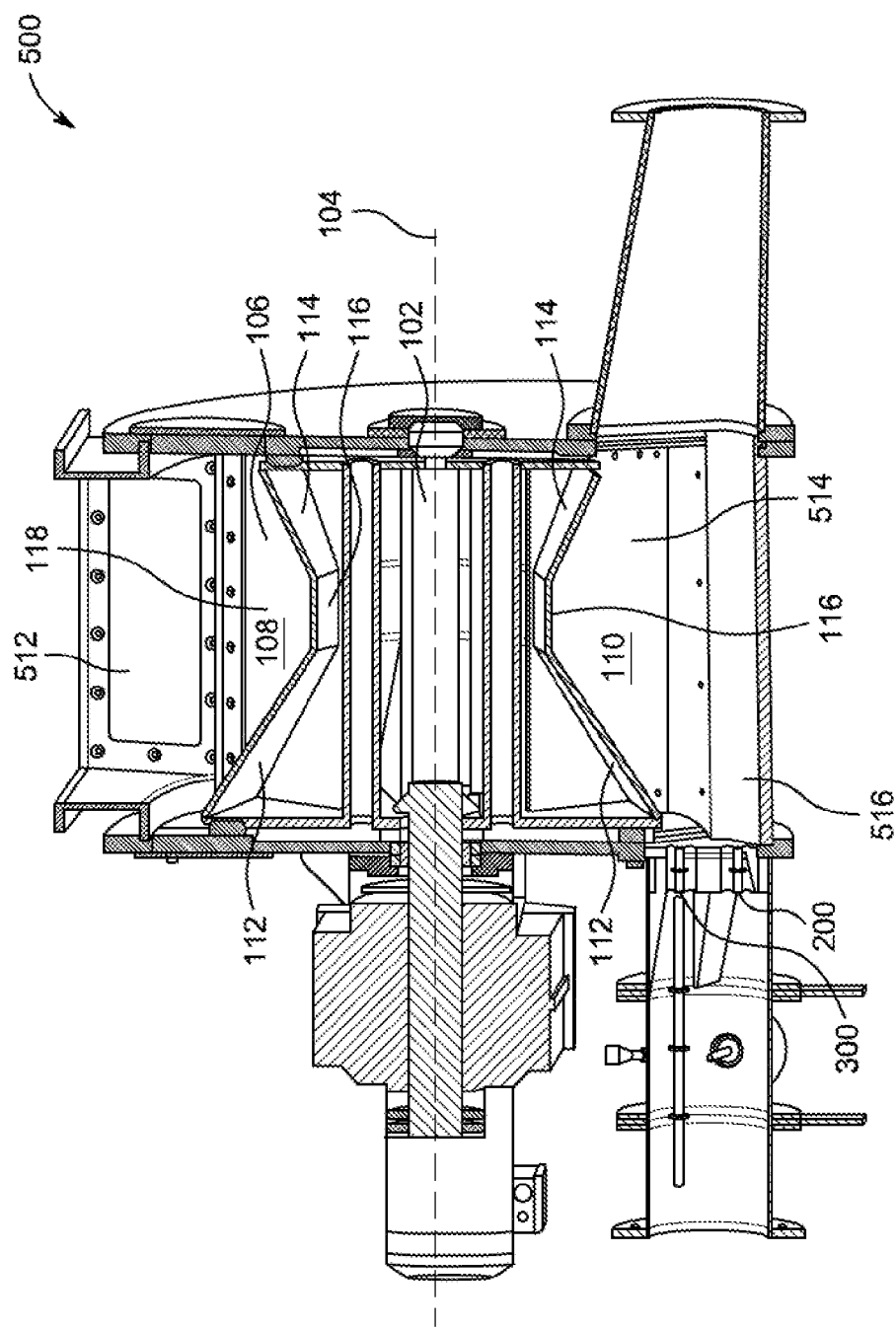
FIG. 6 shows a vertical cross-section along the plane x-y of the blow-through rotary valve of FIG. 5, showing a rotor assembly with a chamber in the loading configuration and a chamber in the unloading configuration according to an embodiment of the present invention.

FIG. 6 shows a vertical cross-section along the plane x-y of the blow-through rotary valve 500 of FIG. 5, showing a rotor assembly 100 with a chamber 106 in the loading configuration (top chamber 106) and a chamber 106 in the unloading configuration (bottom chamber 106).

As shown in FIG. 5, the rotor assembly 100 comprises a drive shaft 102, which defines a drive axis 104 along its length. The rotor assembly has a plurality of chambers 106 (two can be clearly observed in this cross-section), which are operatively connected to the drive shaft 102.

Each chamber 106 comprises a first end wall 112 and second end wall 114 which are axially spaced along the drive axis 104 and in this embodiment are connected by an intermediate portion 116. In this embodiment, the intermediate portion 116 is substantially parallel to the drive axis.

Each chamber 106 also comprises a first side wall 108 (only visible in the top chamber 106) and a second side wall 110 (only visible in the bottom chamber 106), the first and second side walls 108 and 110 extending substantially laterally from the drive axis 104, each side wall 108, 110 running substantially parallel to the drive axis 104.

As discussed for FIG. 4, the first end wall 112 extends from the intermediate portion 116 at a first obtuse angle and the second end wall 114 extends at a second obtuse angle relative to the intermediate portion 116. The first end wall 112 is longer than the second end wall 114. The first end wall defines at least about 25% of the overall length of the chamber offset from about 130° to about 160° from the drive axis. The first end wall 112 is offset from about 130° to about 160° from the drive axis. The second end wall 114 is offset from about 130° to about 180° from the drive axis. The first end wall 112 and the second end wall 114 are disposed at an angle from about 130° to about 160° from each other.

Each chamber 106 defines an opening 118 at or towards a radial outer portion of the chamber 106.

The top chamber 106 is in the loading configuration and it has its opening 118 accessible from the inlet 512 of the housing. In use, material can be loaded into chamber 106 in the loading configuration via the inlet 512 of the housing.

Bottom chamber 106 is shown in the unloading configuration, and it is accessible via an housing outlet 514. Operatively connected to the housing outlet 514 there is a trough 516, which is configured to receive any material from chamber 106 and pressurized airflow from a primary pressurized gas inlet 200 and a secondary pressurized gas inlet 300.

In this embodiment, secondary pressurized gas inlet 300 is disposed above primary pressurized gas inlet 200 and both inlets provide a pressurized gas flow (e.g. compressed air flow) along pressurized gas axes which are both substantially parallel to the drive axis 104. In this embodiment, the primary pressurized gas inlet is a primary nozzle 200 and secondary pressurized gas inlet is a secondary nozzle 300.

In use, pressurized gas flow will be provided from nozzles 200 and 300 inside the trough and towards outlet cone 520. The primary pressurized gas axis 210 and the drive axis may be parallel (or substantially parallel) and vertically (or substantially vertically) aligned. The primary pressurized gas axis 210 and secondary pressurized gas axis 310 may be parallel (or substantially parallel) and vertically (or substantially vertically) offset. The primary pressurized gas axis 210 and the drive axis 104 may be parallel (or substantially parallel) and vertically (or substantially vertically) aligned and the secondary pressurized gas axis 310 may be parallel (or substantially parallel) and vertically (or substantially vertically) offset from the primary pressurized gas axis 310 and the drive axis 104.

In the unloading configuration shown in bottom chamber 106, the first end wall 112 is disposed adjacent to the secondary nozzle 300. When the pressurized gas flow encounters the edge of the first end wall, it deviates from the secondary gas axis 310 and follows the surface of the chamber from the first end wall 112 to the second end wall 114, passing by the intermediate portion 116. Therefore, the chamber defines an asymmetrical flow-path of gas inside the chamber in the unloading configuration, so that the asymmetrical flow-path scrapes any material that may be stuck to the walls of the chamber.

The primary nozzle 200 supplies a higher volume flow than the secondary nozzle 300. The gas flow velocities from the primary and secondary nozzles 200, 300 is similar and from about 100 m/s to about 200 m/s. This arrangement generates a pressure differential in the chamber, which leads to the creation of a vortex inside the chamber.

Each chamber can be viewed as a basket with trapezoidal shape. Therefore, each chamber 106 is asymmetric when viewed in a cross-section perpendicular to the drive axis 104. This stimulates a vortex flow inside the chamber when the opening 118 of the chamber 106 is in contact with a gas flow.

The shape of the chamber 106 along the drive axis 104 (i.e. from the first end wall 112, to the intermediate portion 116 and to the second end wall 114) distributes the pressure of the gas flow from the primary 200 and secondary 300 nozzles around the internal surface of the chamber and creates an asymmetrical flow-path.

Without wishing to be bound by theory, the creation of the asymmetrical flow-path of gas may be based on the Coanda effect.

Figure 7:
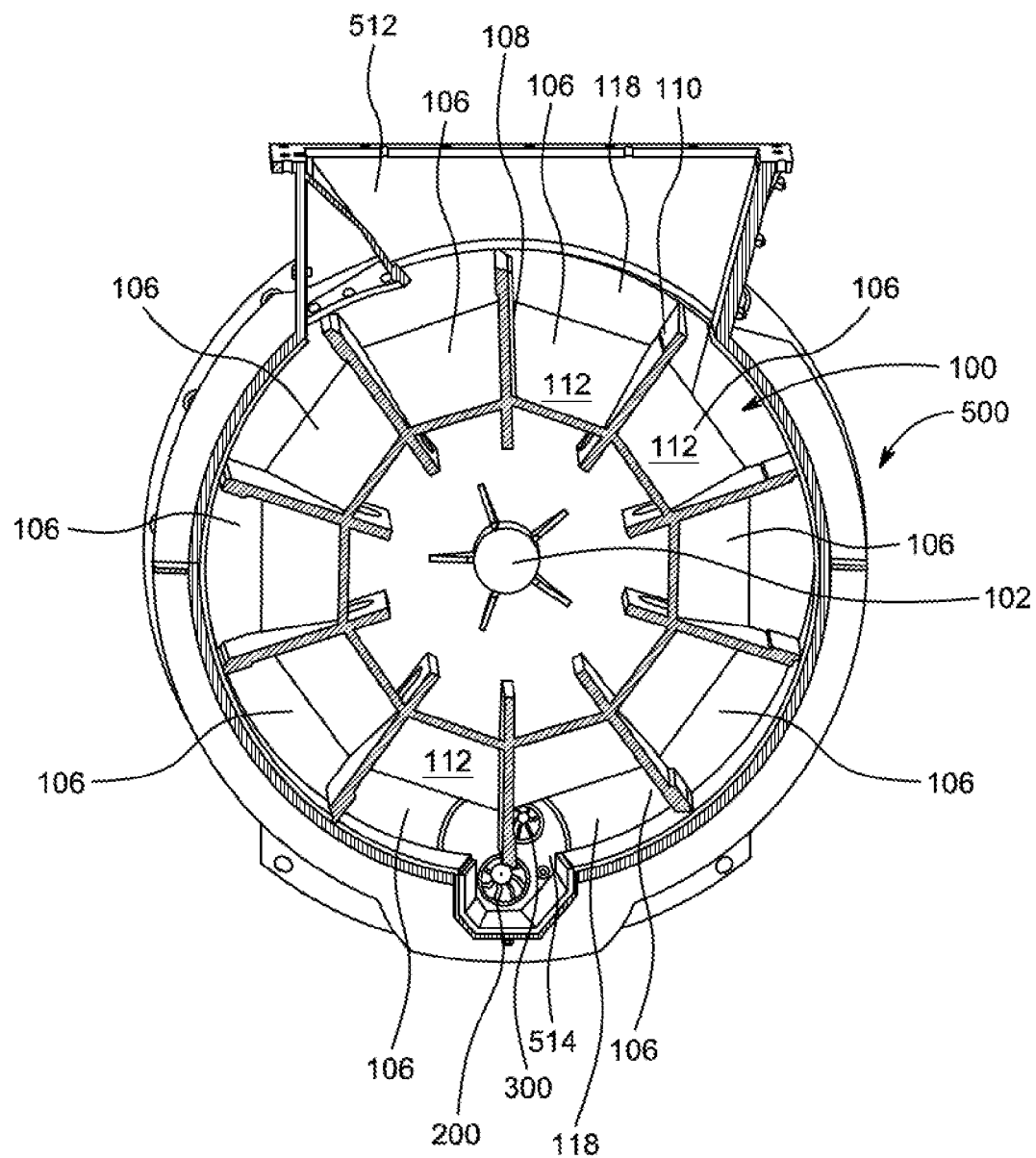
FIG. 7 shows a vertical cross-section along the plane y-z of the blow-through rotary valve of FIGS. 5 and 6, showing a rotor assembly with ten chambers according to an embodiment of the present invention.

FIG. 7 shows a vertical cross-section along the plane y-z of the blow-through rotary valve 500 of FIGS. 5 and 6, showing a rotor assembly 100 with ten chambers 106. In use, rotor assembly 100 is configured to rotate in a clockwise or in an anti-clockwise direction. The direction of rotation of the rotor assembly does not affect its function. In this view it can be appreciated that the end wall 112 of each of the chambers is inclined with respect to the drive axis defined along the drive shaft 102. Side walls 108 and 110 create an air lock which enables the gas flow delivered by nozzles 200 and 300 to be localized in the trough area and only the chambers 106 which are in the unloading configuration (in the housing outlet 514 at the bottom of the blow-through rotary valve).

Secondary nozzle 300 is disposed above primary nozzle 200 and vertically (or substantially vertically) offset from it. As will be appreciated, the gas flow (e.g. compressed air) delivered by primary nozzle 200 is located inside the trough while the gas flow (e.g. compressed air) delivered by secondary nozzle 300 is disposed above the trough area and inside the cavity of the chamber 106 which becomes operatively connected with the housing outlet 514 in the unloading configuration.

The outer edge of end wall 112 is configured to be disposed directly above the gas flow of the secondary nozzle 300 so that the Coanda effect can take place and at least part of the gas flow from nozzle 300 (and possibly also from nozzle 200) follows the surface of end wall 112, intermediate portion 116 and second end wall 114, thus creating an asymmetric flow path which creates a vortex inside the chamber 106 and scrapes any material adhered to the walls of the chamber 106 (end walls 112, 114, intermediate portion 116 and side walls 108, 110).

Figure 8:
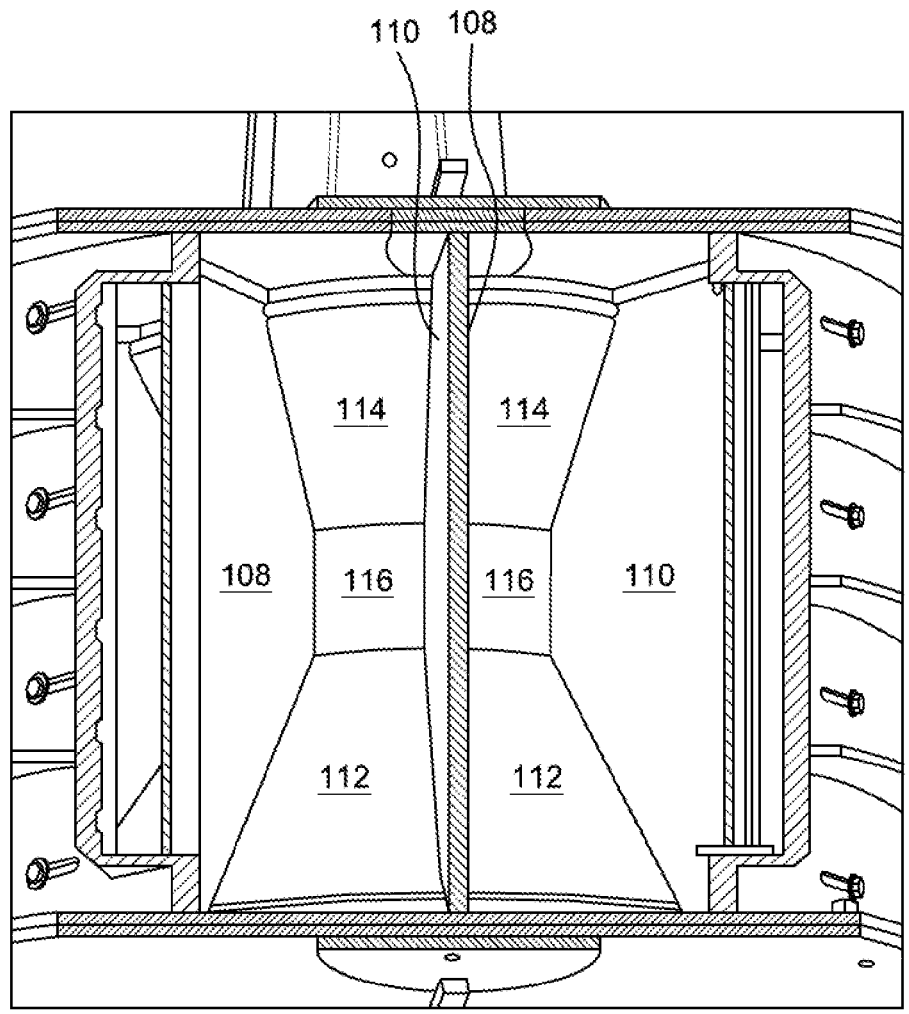
FIG. 8 shows a horizontal cross-section along the plane x-z of the blow-through rotary valve of FIGS. 5, 6 and 7, showing two consecutive chambers of the rotor assembly according to an embodiment of the present invention.

FIG. 8 shows a horizontal cross-section along the plane x-z of the blow-through rotary valve 500 of FIGS. 5, 6 and 7, showing two consecutive chambers 106 of the rotor assembly 100. In FIG. 8 it can be appreciated that the rotary assembly 100 has chambers which resemble asymmetric baskets with trapezoidal shape.

Advantageously, the blow-through rotary valve 500 according to the present invention comprises a self-cleaning rotor assembly 100 and it therefore requires lower maintenance than conventional blow-through rotary valves. This increases productivity of pneumatic pipelines, since it greatly reduces or avoids the need for stopping production at regular intervals to clean the rotor assembly. It also provides a more efficient cleaning of the chambers 106 of the rotor assembly 100 compared to prior art blow-through rotary valves which use mechanical means in self-cleaning rotary assemblies.

The self-cleaning rotor assembly 100 of blow-through rotary valve 500 is also more efficient than prior art blow-through rotary valves, since maintaining the chambers 106 free from residues and/or debris allows each chamber 106 to maximize the volume of material which can be transferred at each revolution (i.e. the capacity of chambers 106 is not reduced over time).

The self-cleaning rotor assembly 100 of blow-through rotary valve 500 minimizes problems of clogging or blockage of the blow-through rotary valve, which also assists in maintaining the airlock inside the rotary valve. This is particularly advantageous in pneumatic conveyor systems which process sticky or moist materials (for example bulk refuse materials), since this type of material is extremely difficult to process and tends to adhere to the chambers of rotary assemblies, thus causing blockages in conventional blow-through rotary valves.

Whilst various exemplary embodiments have been disclosed, it shall be understood that variations, modifications and combinations of the valve and methods disclosed herein disclosed herein may be made without departing from the scope of the appended claims.

What is claimed is:

1. A rotor assembly for a blow-through rotary valve, the rotor assembly comprising:
    a drive shaft defining a drive axis along its length;
    at least one chamber operatively connected to the drive shaft, the at least one chamber comprising a first end wall and a second end wall, the first and second end walls being axially spaced along the drive axis;
    a first side wall and a second side wall, the first and second side walls extending substantially laterally from the drive axis, the first and second side walls extending substantially parallel to the drive axis,
    wherein the at least one chamber defines an opening at or towards a radial outer portion of the at least one chamber,
    wherein the at least one chamber is asymmetric along a plane containing the drive axis, and
    wherein the first end wall and the second end wall together define a concave surface which is configured to be in contact with material to be loaded and unloaded in the rotor assembly so that the at least one chamber stimulates a vortex flow when the opening of the at least one chamber is in contact with a gas flow.

2. The rotor assembly according to claim 1, wherein the first end wall extends at a first angle relative to the drive axis and the second end wall extends at a second angle relative to the drive axis.

3. The rotor assembly according to claim 2, wherein the first angle and the second angle are different or wherein the first angle and the second angle are the same.

4. The rotor assembly according to claim 2, wherein the first angle is an obtuse angle and/or wherein the second angle is an obtuse angle.

5. The rotor assembly according to claim 1, wherein the first angle is from about 130° to about 170° and/or wherein the second angle is from about 130° to about 180°.

6. The rotor assembly according to claim 2, wherein the first angle is greater than the second angle.

7. The rotor assembly according to claim 1, wherein the first end wall is longer than the second end wall or wherein the first end wall is at least about 25% of the length of a surface of the at least one chamber along the drive axis measured from an end of the first end wall to and end of the second end wall.

8. The rotor assembly according to claim 1, wherein there is an intermediate portion between the first and second end walls, or wherein the intermediate portion is parallel to the drive axis.

9. The rotor assembly according to claim 8, wherein the first end wall extends at an obtuse angle relative to the intermediate portion and/or wherein the second end wall extends at an obtuse angle relative to the intermediate portion.

10. The rotor assembly according to claim 1, wherein the rotor assembly is configured to be disposed inside a housing of a blow-through rotary valve, and wherein the rotor assembly is configured to rotate about the drive axis so that the at least one chamber defines a loading configuration in which the opening of the at least one chamber is operatively connected to a housing inlet and an unloading configuration in which the opening of the at least one chamber is operatively connected to a housing outlet, and wherein the at least one chamber is configured to receive material via the housing inlet when in the loading configuration, and wherein the at least one chamber is configured to receive a gas flow in the unloading configuration so that the gas flow assists in removing the material from the at least one chamber.

11. The rotor assembly according to claim 10, wherein the at least one chamber defines an asymmetrical flow-path of gas inside the at least one chamber in the unloading configuration, so that the asymmetrical flow-path scrapes the material from the walls of the at least one chamber.

12. The rotor assembly according to claim 10, wherein the first end wall and the second end wall define a concave surface which in use is configured to be in contact with material, wherein, when the rotor assembly is in the unloading configuration, the first end wall is configured to be located adjacent a pressurized gas inlet, wherein the pressurized gas inlet is configured to deliver pressurized gas flow along a gas axis which is substantially parallel to the drive axis, and wherein when pressurized gas flow contacts the first end wall, the pressurized gas flow enters the at least one chamber and follows the surface of the at least one chamber from the first end wall to the second end wall deviating from the gas axis and creating a vortex inside the at least one chamber so that material is substantially removed from the walls of the at least one chamber.

13. The rotor assembly according to claim 12, wherein, when the at least one chamber is in the unloading configuration, at least a portion of the first end wall intersects or is in close proximity to the pressurized gas flow.

14. The rotor assembly according to claim 12, wherein, when the at least one chamber is in the unloading configuration the pressurized gas inlet is disposed at or towards an outermost portion of the first end wall such that pressurized gas flow from the pressurized gas inlet follows the surface of the at least one chamber from the first end wall to the second end wall.

15. The rotor assembly according to claim 14, wherein the pressurized gas inlet is a primary pressurized gas inlet which is configured to deliver pressurized gas for substantially removing material from the walls of the at least one chamber and for conveying the material in a pneumatic pipeline.

16. The rotor assembly according to claim 14, wherein the pressurized gas inlet is a secondary pressurized gas inlet which is configured to deliver pressurized gas for substantially removing material from the walls of the at least one chamber and there is a primary pressurized gas inlet for conveying the material in a pneumatic pipeline, wherein the primary pressurized gas inlet is configured to deliver pressurized gas along a primary gas axis and the secondary pressurized gas inlet is configured to deliver pressurized gas along a secondary gas axis, and wherein the primary and the secondary gas axes are substantially parallel to the drive axis.

17. The rotor assembly according to claim 16, wherein the primary pressurized gas axis and the drive axis are parallel or substantially parallel and vertically or substantially vertically aligned and the secondary pressurized gas axis is parallel or substantially parallel and vertically or substantially vertically offset from the primary pressurized gas axis and the drive axis.

18. A blow-through rotary valve comprising:
a housing having an inlet for receiving material and an outlet for releasing the material;
a rotor assembly comprising:
a drive shaft defining a drive axis along a length thereof; and
at least one chamber operatively connected to the drive shaft, the at least one chamber comprising:
a first end wall and second end wall, the first and second end walls axially spaced along the drive axis; and
a first side wall and second side wall, the first and second side walls extending substantially laterally from the drive axis, the first and second side walls extending substantially parallel to the drive axis,
wherein the at least one chamber is asymmetric along a plane containing the drive axis and defining an opening at or towards a radial outer portion of the at least one chamber,
wherein the rotor assembly is configured to rotate about the drive axis so that the at least one chamber defines:
a loading configuration in which the opening of the at least one chamber is operatively connected to the housing inlet; and
an unloading configuration in which the opening of the at least one chamber is operatively connected to the housing outlet;
a pressurized gas inlet; and
a trough for conveying material released from the rotor assembly,
wherein the rotor assembly is disposed inside the housing such that the first end wall of the at least one chamber is disposed adjacent to the pressurized gas inlet when the at least one chamber is in the unloading configuration such that, in the unloading configuration, at least a portion of the pressurized gas flow is configured to contact the first end wall of the at least one chamber enter the at least one chamber and follow the surface of the at least one chamber from the first end wall to the second end wall deviating from the gas axis and creating a vortex inside the at least one chamber so that material is substantially removed from the walls of the at least one chamber and delivered to the trough.

19. The blow-through rotary valve according to claim 18, wherein the pressurized gas inlet is a primary pressurized gas inlet which delivers pressurized gas along a primary gas axis for substantially removing material from the walls of the at least one chamber and for conveying the material in a pneumatic pipeline or wherein when the at least one chamber is in the unloading configuration, a portion of the pressurized gas deviates from the primary gas axis and creates an asymmetrical flow-path of gas inside the at least one chamber so that the asymmetrical flow-path scrapes the material from the walls of the at least one chamber.

20. The blow-through rotary valve according to claim 18, wherein the blow-through rotary valve comprises two pressurized gas inlets: a primary pressurized gas inlet defining a primary pressurized gas axis and a secondary pressurized gas inlet defining a secondary pressurized gas axis, or wherein the primary pressurized gas inlet is disposed below the secondary pressurized gas inlet.

21. The blow-through rotary valve according to claim 18, wherein the pressurized gas inlet is a secondary gas inlet which delivers pressurized gas for substantially removing material from the walls of the at least one chamber and the blow-through rotary valve further comprises a primary pressurized gas inlet for conveying the material in a pneumatic pipeline, wherein the primary pressurized gas inlet is configured to deliver pressurized gas along a primary gas axis and the secondary pressurized gas inlet is configured to deliver pressurized gas along a secondary gas axis, and wherein the primary and the secondary gas axes are substantially parallel to the drive axis.

22. The blow-through rotary valve according to claim 20, wherein the primary pressurized gas axis and the drive axis are parallel or substantially parallel and vertically or substantially vertically aligned and the secondary pressurized gas axis is parallel or substantially parallel and vertically or substantially vertically offset from the primary pressurized gas axis and the drive axis.

23. A method of conveying material in a pneumatic pipeline, the method comprising:
providing a blow-through rotary valve comprising: a housing having an inlet for receiving material and an outlet for releasing the material; a rotor assembly comprising: a drive shaft defining a drive axis along a length thereof; and at least one chamber operatively connected to the drive shaft, the at least one chamber comprising: a first end wall and second end wall, the first and second end walls being axially spaced along the drive axis; and a first side wall and a second side wall extending substantially laterally from the drive axis and extending substantially parallel to the drive axis; and the at least one chamber being asymmetric along a plane containing the drive axis and defining an opening at or towards a radial outer portion of the at least one chamber, wherein the rotor assembly is configured to rotate about the drive axis so that the at least one chamber defines a loading configuration in which the opening of the at least one chamber is operatively connected to the housing inlet and an unloading configuration in which the opening of the at least one chamber is operatively connected to the housing outlet; a pressurized gas inlet; and a trough for conveying material released from the rotor assembly;

connecting the trough of the blow-through rotary valve with a pneumatic pipeline;

inserting material through the inlet of the blow-through rotary valve such that the material is loaded in the at least one chamber of the rotor assembly when the blow-through rotary valve is in the loading configuration;

rotating the rotor assembly so that the at least one chamber is operatively connected to the outlet of the housing in the unloading configuration;

providing pressurized gas flow via the pressurized gas inlet, wherein when the at least one chamber is in the unloading configuration, at least a portion of the pressurized gas flow contacts the first end wall of the at least one chamber enters the at least one chamber and follows a surface of the at least one chamber from the first end wall to the second end wall so that the at least a portion of gas flow deviates from the gas axis and creates a vortex inside the at least one chamber, the vortex substantially removing material from the walls of the at least one chamber and delivering the material to the trough; and conveying the material from the trough to the pneumatic pipeline with pressurized gas.

* * * * *